(12) United States Patent
Kreuzenstein et al.

(10) Patent No.: US 7,139,240 B2
(45) Date of Patent: Nov. 21, 2006

(54) FRAME-PULL FLOW CONTROL IN A FIBRE CHANNEL NETWORK

(75) Inventors: Ronald K. Kreuzenstein, Sunnyvale, CA (US); David C. Banks, Pleasanton, CA (US); Kreg A. Martin, Los Gatos, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 1081 days.

(21) Appl. No.: 10/134,744

(22) Filed: Apr. 29, 2002

(65) Prior Publication Data

US 2003/0202474 A1    Oct. 30, 2003

(51) Int. Cl.
*G08C 15/00* (2006.01)

(52) U.S. Cl. .................... 370/230; 370/235
(58) Field of Classification Search .................. None
See application file for complete search history.

(56) References Cited

U.S. PATENT DOCUMENTS 6,157,967 A * 12/2000 Horst et al. .................. 710/19
6,337,852 B1 * 1/2002 Desnoyers et al. ......... 370/236
6,678,244 B1 * 1/2004 Appanna et al. ............ 370/229
6,804,194 B1 * 10/2004 Kadambi et al. ........... 370/229

* cited by examiner

Primary Examiner—Chau Nguyen
Assistant Examiner—Jordan Hamann
(74) Attorney, Agent, or Firm—Wong, Cabello, Lutsch, Rutherford & Brucculeri, LLP

(57) ABSTRACT

A link level flow control technique implements a "pull frame" transmission model in a Fibre Channel network. In one embodiment, frames remain in a first Fibre Channel device until they are requested by a second Fibre Channel device, wherein the second Fibre Channel device does not issue a request unless conditions are such that it can immediately transmit the frame toward its target destination. In another embodiment, a Fibre Channel device provides hardware messaging capability to support the pull model. In yet another embodiment, multiple Fibre Channel devices in accordance with the invention may be coupled to provide high port-count Fibre Channel switches.

130 Claims, 10 Drawing Sheets

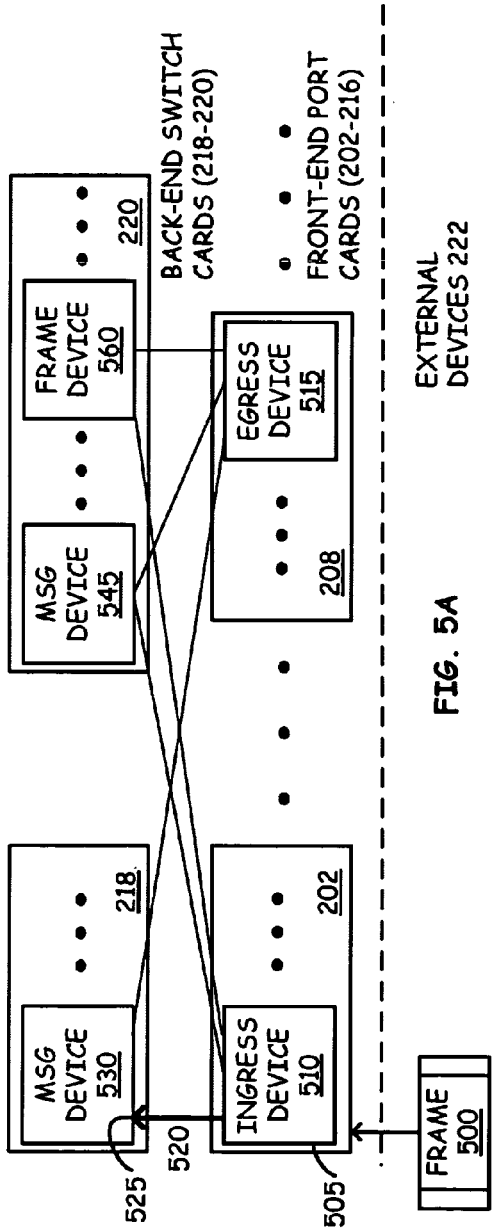
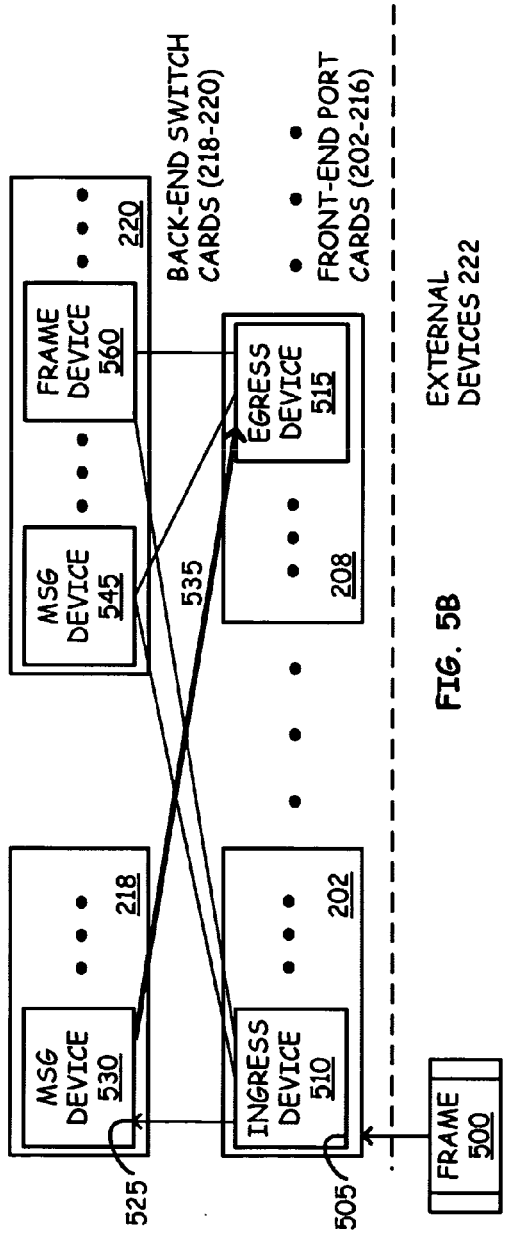
FIG. 5A
FIG. 5B

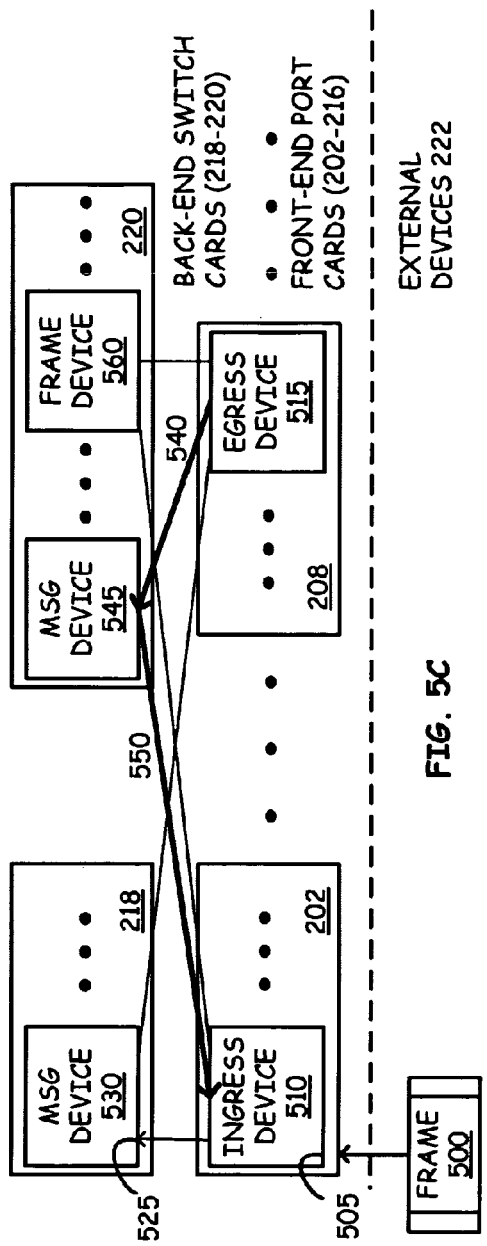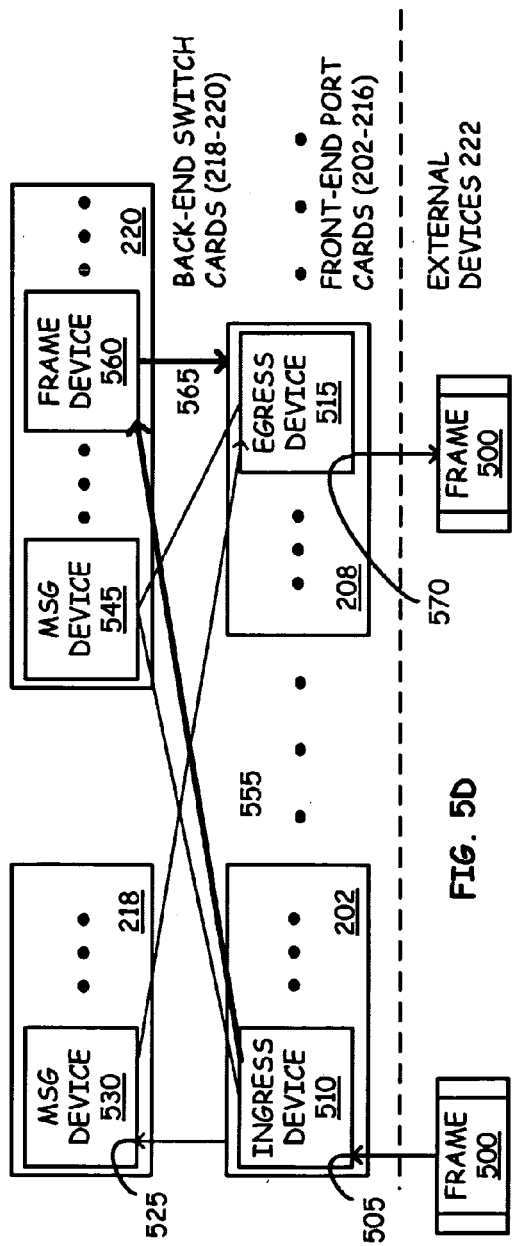

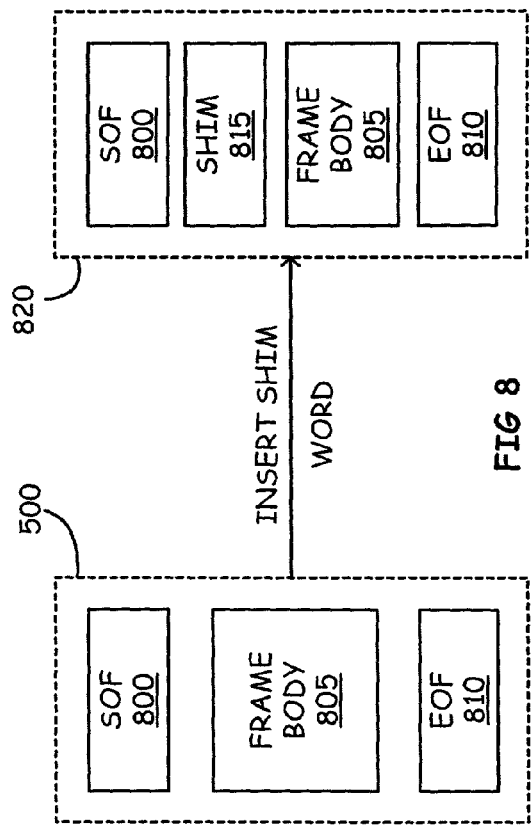
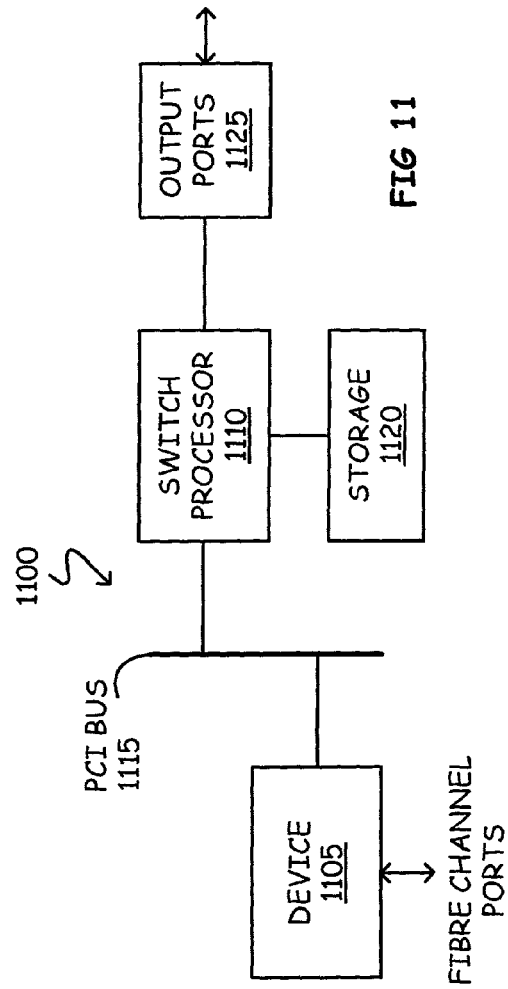
FIG 8
FIG 11

US 7,139,240 B2

FRAME-PULL FLOW CONTROL IN A FIBRE CHANNEL NETWORK

BACKGROUND

The invention relates generally to data transmission in a Fibre Channel network and, more particularly but not by way of limitation, to techniques for controlling the flow of data between Fibre Channel switch devices.

As used herein, the phrase "Fibre Channel" refers to the Fibre Channel family of standards promulgated by the American National Standards Institute as ANSI X.3/T11. In general, Fibre Channel defines a high-speed serial transport system that uses a hierarchically structured information exchange protocol consisting of frames, sequences and exchanges. A "frame" is the atomic unit of data transmission between two communicating devices. A "sequence" is a set of one or more related data frames w transmitted unidirectionally from one device to another device within an exchange. An "exchange" is the basic construct for coordinating the transfer of information between communicating devices during higher layer protocol operations such as Small Computer System Interface (SCSI) and Transport Control Protocol/Internet Protocol (TCP/IP).

In Fibre Channel networks a credit-based protocol is used to manage the pace and flow of frames end-to-end between devices and buffer-to-buffer between a device and the intervening fabric to prevent data overrun at the receiver. The "credit" associated with a flow of frames represents the number of receive buffers allocated to a transmitting port. (See the ANSI X3.297 (1997) standard FC-PH-2 entitled Fibre Channel Physical and Signaling Interface-2 and the ANSI X3.303 (1998) standard FC-PH-3 entitled Fibre Channel Physical and Signaling Interface-3.) In accordance with this standard, Fibre Channel flow control is based on a "push" model (referred to as the cascaded-fabric data transmission model in the FC-PH-3 specification) wherein a frame source pushes data through the network only when it has been granted the credit to do so. Further, credits are withheld or granted without regard to whether the transmitting port can send a frame immediately. As a result, frames can accumulate at the transmitting port (the switch containing the transmitting port) and block other frames from being transmitted. This, in turn, can lead to congestion and head-of-line blocking problems in large port-count switches.

Accordingly, it would be beneficial to provide a technique for managing the flow of frames through a Fibre Channel network comprising large switches that significantly reduce the frame congestion and head-of-line blocking problems associated with a push-type protocol.

SUMMARY

In one embodiment the invention provides a method and device to transmit Fibre Channel frames. The method includes: receiving (at a first Fibre Channel port on a first Fibre Channel switch device) a first frame; sending a first message to a second Fibre Channel switch device through a first message port on the first Fibre Channel switch device; receiving a second message (through a second message port on the first Fibre Channel switch device); and sending the first frame to the second Fibre Channel switch device through a second Fibre Channel port on the first Fibre Channel switch device, the first frame modified to indicate the identity the second Fibre Channel switch device and a Fibre Channel port on the second Fibre Channel switch device.

In another embodiment, the invention provides another method and device to transmit Fibre Channel frames. The method includes: receiving a first message from a first Fibre Channel switch device through a first message port on a second Fibre Channel switch device; acquiring resources at the second Fibre Channel switch device for a frame identified by the first message; sending a second message to the first Fibre Channel switch device through a second message port on the second Fibre Channel switch device, the second message indicating that the second Fibre Channel switch device can accept the frame from the first Fibre Channel switch device, the second message further indicating a pull-frame identifier associated with the frame; and receiving the frame at a first Fibre Channel port on the second Fibre Channel switch device, the frame including the pull-frame identifier.

In yet other embodiments, the invention provides devices to implement a Fibre Channel switch and apparatus for each of the aforementioned methods.

BRIEF DESCRIPTION OF THE DRAWINGS

FIGS. 5A through 5D show data flow through a Fibre Channel switch in accordance with one embodiment of the invention.

FIG. 8 shows, in block diagram form, a modified data frame in accordance with one embodiment of the invention.

FIG. 11 shows, in block diagram form, a switch system in accordance with one embodiment of the invention.

DETAILED DESCRIPTION

The invention relates generally to data transmission in a Fibre Channel network and, more particularly but not by way of limitation, to methods and devices for controlling the flow of data between Fibre Channel switch devices in a Fibre Channel network using a "pull" frame transmission model. The following embodiments of the invention, described in terms of a large port-count Fibre Channel switch, are illustrative only and are not to be considered limiting in any respect.

A link level flow control technique in accordance with the invention implements a "pull" frame transmission model in a Fibre Channel network (hereafter, the "pull model"). In one embodiment, frames remain in a first Fibre Channel device until they are requested by a second Fibre Channel device, wherein the second Fibre Channel device does not issue a request unless conditions are such that it can immediately transmit the frame toward its target destination. In another embodiment, a Fibre Channel device provides hardware messaging capability to support the pull model. In yet another embodiment, multiple Fibre Channel devices in accordance with the invention may be coupled to provide high port-count Fibre Channel switches.

Figure 1:
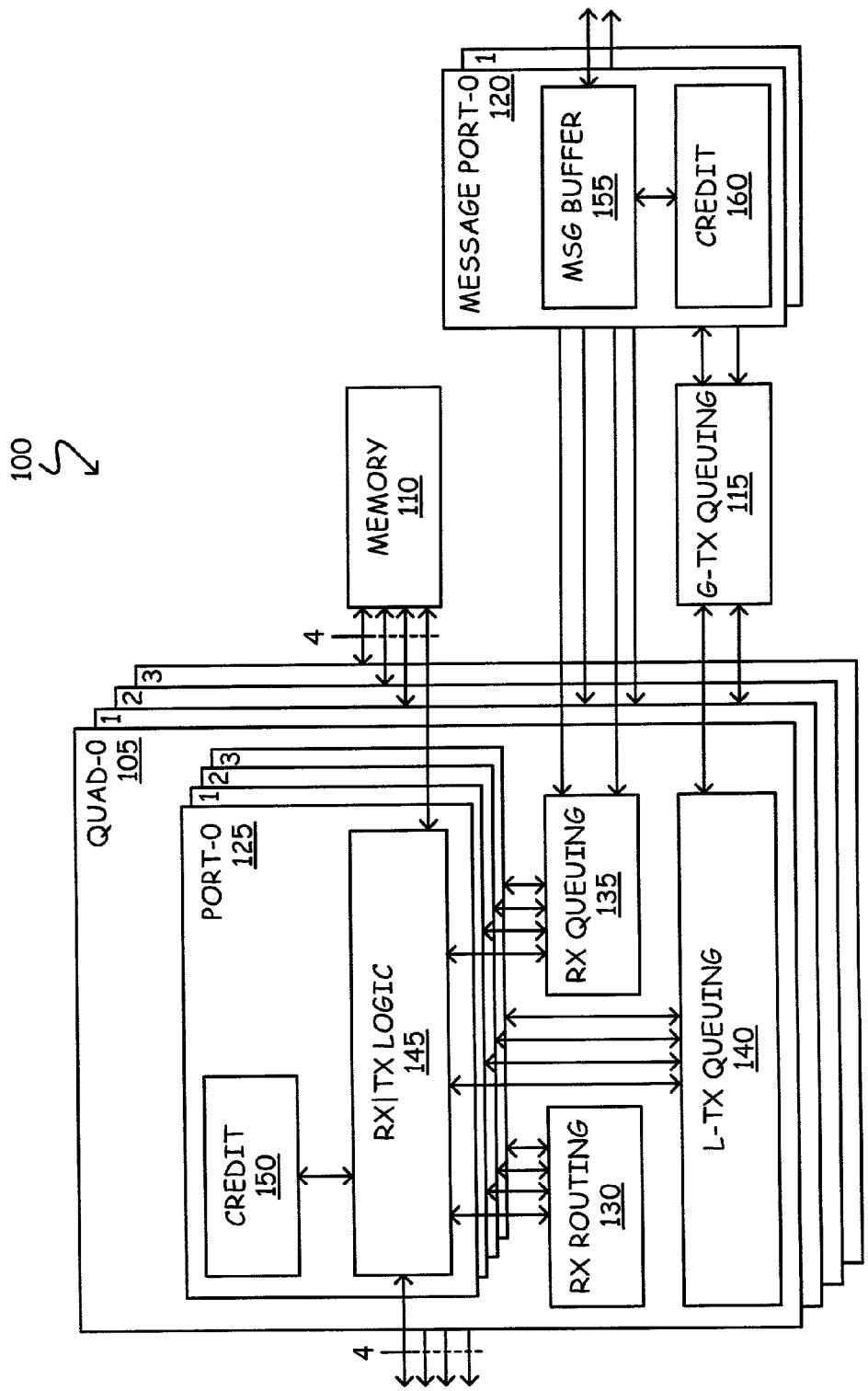
FIG. 1 shows, in block diagram form, a Fibre Channel switch device in accordance with one embodiment of the invention.

Referring to FIG. 1, Fibre Channel switch device 100 in accordance with one embodiment of the invention is shown in block diagram form. Device 100 comprises four operational units or "quads" (only quad-0 105 is shown in detail), central memory 110, global transmit queuing logic 115 and two message ports (only message port-0 120 is shown in detail). Each quad (e.g., quad-0 105) includes four Fibre Channel ports (only port-0 125 is shown in detail), receive routing logic 130, receive queuing logic 135 and local transmit queuing logic 140. Each port circuit (e.g., port-0 125) includes receive/transmit logic 145 and credit control logic 150. And each message port (e.g., message port-0 120) includes message port buffer 155 and credit control logic 160. As described below, message ports may be used to facilitate inter-switch messaging to implement a pull model in accordance with the invention.

In the embodiment of FIG. 1, memory 110 provides the temporary storage required for data transmission in a Fibre Channel environment. (Details of one embodiment for memory 110 is described in U.S. Pat. No. 6,160,813.) In addition, each quad (e.g., quad-0 105) provides the necessary logic and physical interface to implement Fibre Channel ports. In particular, receive/transmit logic 145 may provide 8b/10b data encoding and decoding, Fibre Channel primitive and ordered set recognition and generation, frame and arbitrated loop state machines, and various data path functions, and credit logic 150 may provide standard Fibre Channel hardware-based link level flow control. (See the ANSI X3.303-1998 standard entitled "Fibre Channel Physical and Signaling Interface-3," FC-PH-3.) In addition to supporting the Fibre Channel push transmission model, receive routing logic 130, receive queuing logic 135, local transmit queuing logic 140 and global transmit queuing logic 115 provide capabilities to support the pull transmission model in accordance with the invention as discussed below. Finally, message port 120 provides the logic and physical interface to transmit and receive pull model messages as discussed below.

As shown in FIG. 1, device 100 provides 18 ports—16 Fibre Channel ports (four quads, each providing four ports) and 2 message ports. Each of these ports may be classified as one of three types: external; internal; or messaging. External ports may provide F_Port, FL_Port and E_Port functionality. (An F_Port may be used to operatively couple an external device such as a computer or a peripheral to a Fibre Channel network, or fabric. An FL_Port, may be used to operatively couple a Fibre Channel loop to a Fibre Channel network. An E_Port may be used to operatively couple Fibre Channel switches.) External ports are typically used to connect external devices to a switch comprising, for example, one or more devices 100. Internal ports are used to connect one device 100 to another device 100 to form larger switches (see discussion below). In a similar fashion, message ports may be used to connect a switch's message ports (e.g., message port 120) to another switch's message ports. Unlike internal ports however, message ports are adapted to carry pull model specific messages (see discussion below). All three port types are adapted to carry Fibre Channel style frames using 8b/10b encoding over serial links. Table 1 summarizes the port characteristics of device 100 in accordance with one embodiment of the invention.

TABLE 1

Device 100 Port Capabilities

| Capability | External | Internal | Message |
| --- | --- | --- | --- |
| Quantity | 8 | 8 | 2 |
| Speed (Gbps) | 1, 2, 3 | 1, 2, 3 | 1, 2, 3 |
| F/FL/E_Port | Yes | No | No |
| Routing | Yes | Yes | No |
| Queuing | Yes | Yes | No |
| Central Memory Access | Yes | Yes | No |

In the embodiment of FIG. 1, two quads are adapted to connect to external devices and two quads are adapted to connect to other switch devices. Those quads adapted to couple to external devices are referred to as "external quads" and their associated ports are referred to as "external ports" (see Table 1). Those quads adapted to couple to another switching device are referred to as "internal quads" and their associated ports are referred to as "internal ports" (see Table 1). In one embodiment, global transmit queuing logic 115 and message ports (e.g., message port-0 120) are only coupled to external quads (see FIG. 1).

In a simple Fibre Channel switch, message ports on a first device 100 may be connected directly to the message ports on another device 100. In larger switches, message ports on "edge" devices (those providing external ports) may be coupled to ports (internal or external) on "back-end" devices (that is, devices that comprise a switch's internal communications network and that do not connect directly to external devices). In this latter embodiment, message traffic passes from a message port on an edge device 100 through the one or more back-end devices to a message port on another edge device 100.

Figure 2:
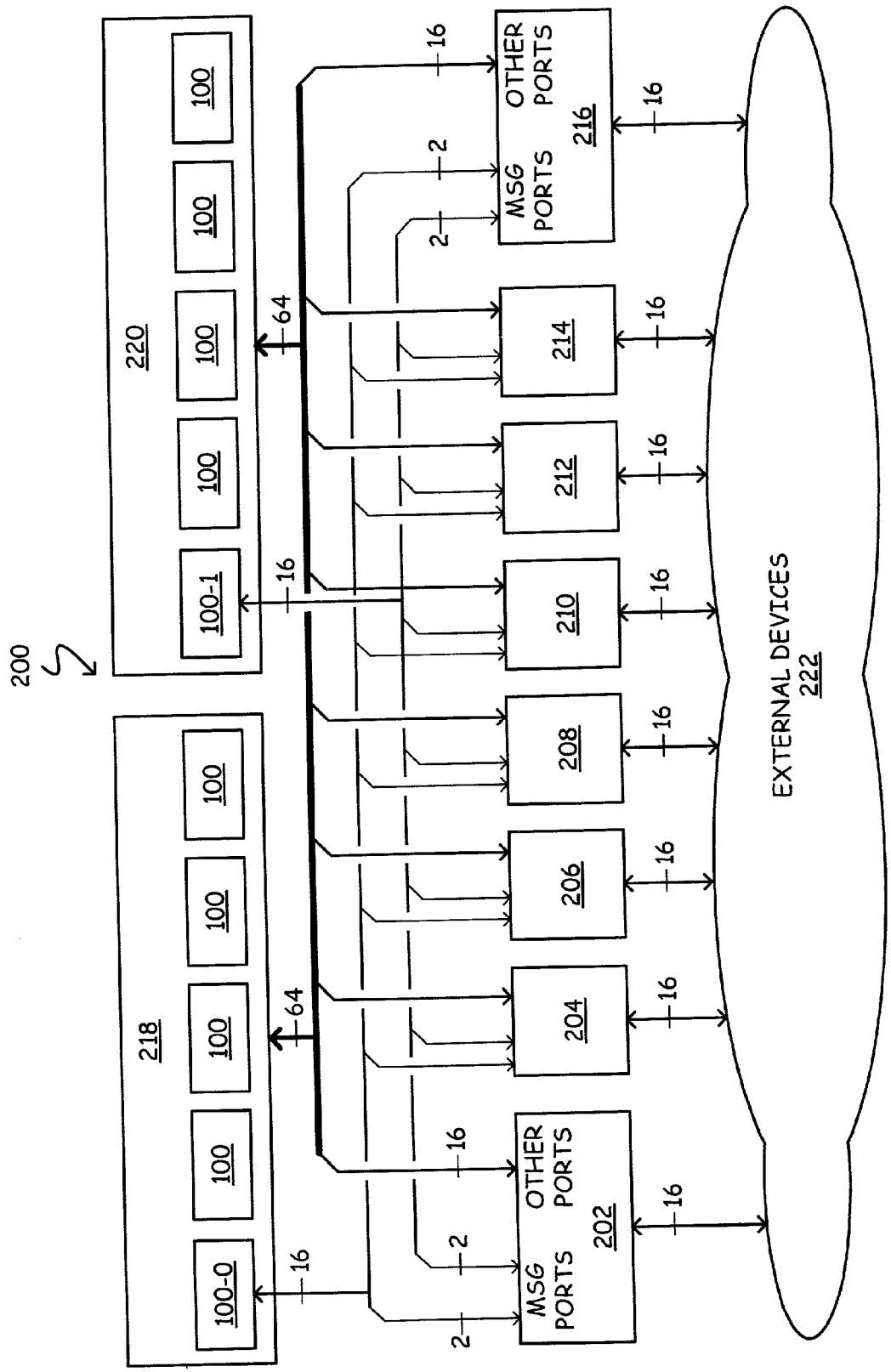
FIG. 2 shows, in block diagram form, a high port-count switch in accordance with one embodiment of the invention.

Referring to FIG. 2, 26 devices in accordance with FIG. 1 may be combined to provide 128 port Fibre Channel switch 200 that is non-blocking at 2.125 Gbps on all ports. Switch 200 comprises 8 front-end port cards (202 through 216) each having 2 100 devices, and 2 back-end switch cards (218 and 220) each having 5 100 devices. Each front-end port card device provides 16 external ports to external devices 222, 16 internal ports and 4 message ports. In the embodiment of FIG. 2, each message port-0 on each front-end port card device is coupled to a specified device (e.g., device 100-0) on a back-end switch card (e.g., switch card 218) and each message port-1 on each front-end port card device is coupled to a different specified device (e.g., device 100-1) on a back-end switch card (e.g., card 220). Accordingly, one device on each of the back-end switch cards 218 and 220 is dedicated to routing message traffic associated with the pull data transmission model. In addition, back-end switch card devices do not use their message ports. Thus, message ports on each of the front-end port cards 202 through 216 are coupled to non-message (i.e., internal or external) ports on the back-end switch cards 218 and 220.

Figure 3:
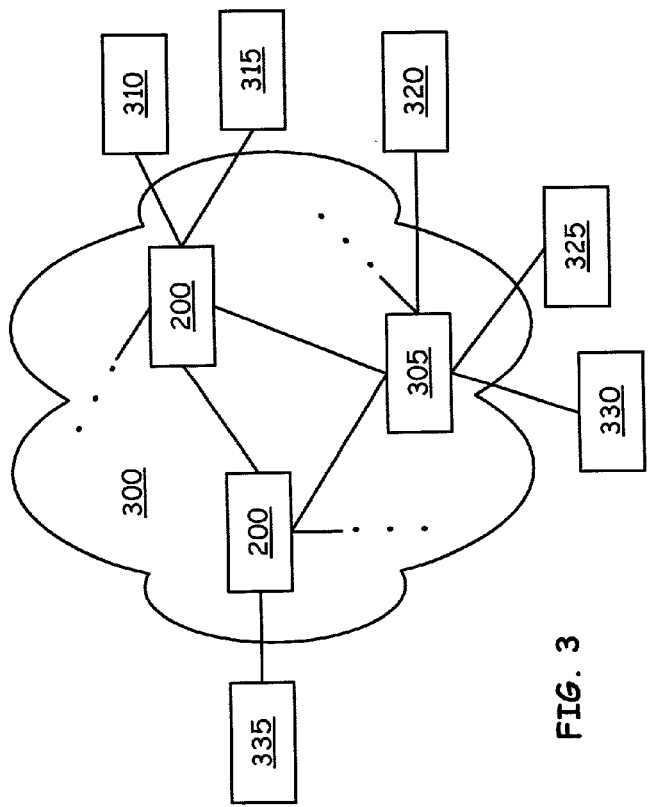
FIG. 3 shows, in block diagram form, a Fibre Channel fabric in accordance with one embodiment of the invention.
Figure 4:
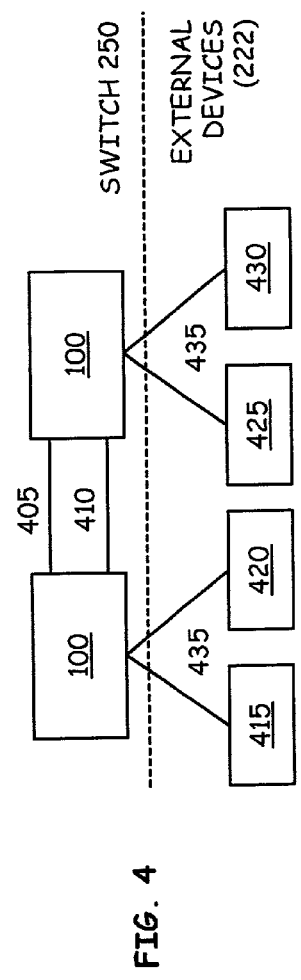
FIG. 4 shows, in block diagram form, a Fibre Channel fabric in accordance with another embodiment of the invention.

In another embodiment (see FIG. 3), Fibre Channel fabric 300 may comprise a plurality of switch devices in accordance with FIG. 2 and, possibly, one or more switch devices 305 in accordance with prior art techniques. In this embodiment, external devices 310 through 335 (generally, external devices 222) are coupled to fabric 300 through ports to individual switch devices. In yet another embodiment (see FIG. 4), a simple switch 250 may comprise two or more devices in accordance with FIG. 2. In this embodiment, devices 100 may be coupled via message ports 405 and internal ports 410 and external devices 415 through 430 (generally, external devices 222) are coupled to switch 250 through external ports 435 on each device 100.

While the pull model may be used in all frame transmission situations, it may be especially beneficial in transmitting unicast frames received from a first port connected to a first off-switch device that are directed to a second port that is connected to a second off-switch device and which, accordingly, traverses a back-end switch device. Consider, for example, the data flow through switch 200 in accordance with the invention as outlined in FIG. 5.

Referring first to FIG. 5A, as frame 500 is received at port 505 of ingress device 510 in front-end port card 202 from an external device 222, port 500's receive/transmit logic 145 begins to store frame 500 in the ingress device's memory 110. At substantially the same time, the ingress device's receive routing logic 130 performs a routing table lookup to determine which device (e.g., egress device 515), and which external port in the identified device, frame 500 is to be transmitted through. In addition, the routing table entry identifies that frame 500 should be transmitted in accordance with the pull model and, as a result, ingress device 510's receive queuing logic 135 makes an entry in its remote put queue indicating that frame 500 is to be transmitted in accordance with the pull data transmission model. The remote put queue (not shown in FIG. 1) is storage within receive queuing logic 135 and, in one embodiment, has sufficient capacity to accommodate a Put Message (see discussion below) for every frame ingress device 510 is capable of holding in memory 110. When the remote put queue is not empty, ingress device 510's receive queuing logic 135 handshakes with an ingress device message port (e.g., message port-0 120) until the message port can transmit a Remote Put Message. (In general, either message port may be selected to transmit a Remote Put Message.) When the selected message port is able, it generates and transmits 520 a Remote Put Message for frame 500 to port 525 in message device 530 on back-end switch card 218 (see discussion above). In one embodiment, Remote Put Messages are encoded, serialized and transmitted as Fibre Channel frames incorporating additional (header) information to identify them as "messages" rather than data frames. (See discussion below.)

As shown in Table 2, the content of a Remote Put Message in accordance with one embodiment of the invention includes: an indication that the message is a Remote Put Message (field 1), identification of the targeted egress device (fields 2 and 3), identification of the ingress device (fields 4 and 5), identification of the buffer or memory location of the Remote Put Message's associated frame in the ingress device's memory (field 6), indication of the incoming frame's virtual channel, if the frame is part of a virtual channel transmission (field 7), and indication of the incoming frame's arbitrated loop physical address, if the frame is part of an arbitrated loop transmission (field 8). For more information on the use of virtual channel technology as it applies to Fibre Channel networks see U.S. patent application Ser. No. 09/929,627, entitled "Quality of Service Using Virtual Circuit Translation," by David C. Banks and Alex Wang, filed Aug. 13, 2001, which is hereby incorporated by reference.

TABLE 2

Remote Put Message Content

| Field | Content |
|---|---|
| 1 | Put Message Indicator |
| 2 | Egrees device identifier |
| 3 | Egress device output port indicator |
| 4 | Ingress device identifier |
| 5 | Ingress device port identifier |
| 6 | Ingress device memory buffer identifier |
| 7 | Virtual channel identifier |
| 8 | Arbitrated loop, physical address identifier |

Referring to FIG. 5B, when the Remote Put Message is received by message device 530 in back-end switch card 218, it is routed 535 in accordance with that device's receive routing logic 130 to targeted egress device 515 where it is received by one of egress device's 515 message ports (e.g., message port-0 120). In one embodiment, all Remote Put Messages from a particular port on an ingress device (e.g., port 505 in ingress device 510) to a particular port on an egress device follow the same path through back-end switch cards (e.g., 218 and 220) to facilitate the in-order delivery of data frames in accordance with the Fibre Channel standard.

Following reception of the Remote Put Message, egress device 515's message port logic (e.g., message port-0 120) passes the Remote Put Message to its global transmit queuing logic 115 where it is queued on a transmit list. (A transmit list identifies all the frames which are "queued" for transmission by a device. Each device may maintain a plurality of "transmit lists." For example, each device may maintain a "transmit list" for each port, or each collection of ports.) Egress device 515's global transmit queuing logic 115 examines its frame transmit list to determine if the identified port in egress device 515 has sufficient buffer space and that the identified external device can accept data frame 500. If egress device 515 determines that data frame 500 can be forwarded to its target destination, it handshakes with one of its message ports to generate and transmit a Get Message. Unlike Remote Put Messages, Get Messages are not required to travel the same route from egress device to ingress device (i.e., through back-end switch cards 218 and 220).

Like Remote Put Messages, Get Messages may be encoded, serialized and transmitted as Fibre Channel frames incorporating additional (header) information to identify them as "messages" rather than data frames. (A discussion of this is provided below.)

As shown in Table 3, the content of a Get Message in accordance with one embodiment of the invention includes: an indication that the message is a Get Message (field 1), identification of the received frame's ingress device (fields 2 and 3), identification of the buffer or memory location of the received frame in the ingress device's memory (field 4), and indication of the incoming frame's Pull-ID (field 5). The Pull-ID is generated by the egress device's global transmit queuing logic 115 and is used by the egress device's local transmit queuing logic 140 to ensure that frames are forwarded to the targeted external device in the same order in which they were transmitted from the originating external device.

TABLE 3

Get Message Content

| Field | Content |
| --- | --- |
| 1 | Get Message Indicator |
| 2 | Ingress device identifier |
| 3 | Ingress device port identifier |
| 4 | Ingress device memory buffer identifier |
| 5 | Pull-ID |

Substantially immediately before generating the Get Message, the device's receive queuing logic 135 checks for, and allocates, the space needed for the "incoming" frame. (See discussion below.)

Referring to FIG. 5C, the Get Message is transmitted 540 to message device 545 in back-end switch card 220, which routes 550 it in accordance with that device's receive routing logic 130 to ingress device 510. (One of ordinary skill in the art will recognize, that message device 545 could be message device 530.) On receipt, the ingress device's message port forwards the Get Message to receive queuing logic 135 which generates and enqueues a Local Put Message on its local put queue. The local put queue (not shown in FIG. 1) is storage internal to receive queuing logic 125 and is the mechanism by which a device's receive queuing logic communicates with the device's local transmit queuing logic 140. In one embodiment, each local put queue has sufficient storage to accommodate one entry for each data frame the device may store in memory 110.

As shown in Table 4, the content of a Local Put Message in accordance with one embodiment of the invention includes: an indication of that port in the local device on which the identified data frame should be transmitted (field 1), identification of the buffer or memory location of the local device where the identified data frame is stored (field 2), identification of the targeted egress device (fields 3 and 4), indication of the data frame's Pull-ID (field 5), indication of the data frame's virtual channel, if the frame is part of a virtual channel transmission (field 6), and indication of the incoming frame's arbitrated loop physical address, if the frame is part of an arbitrated loop transmission (field 7). Fields 6 and 7 are typically utilized during push frame transmission and not during pull frame transmission.

TABLE 4

Local Put Message Content

| Field | Content |
| --- | --- |
| 1 | Local transmit port identifier |
| 2 | Local memory buffer identifier |
| 3 | Egress device identifier |
| 4 | Egress device output port identifier |
| 5 | Data frame Pull-ID |
| 6 | Virtual channel identifier |
| 7 | Arbitrated loop physical address identifier |

Referring now to FIG. 5D, ingress device 510's receive/transmit logic 145 may now transmit data frame 500 toward egress device 515. In doing so, ingress device 510's receive/transmit logic 145 generates and inserts a special "shim word" into data frame 500 to identify the frame as a "pulled" frame. As shown in FIG. 8, if a standard Fibre Channel data frame 500 comprises start of frame element 800, frame body element 805 and end of frame element 810, shim word 815 may be inserted immediately after start of frame element 805 to create modified frame 820. In one embodiment, shim word 815 identifies the egress device (device and port identifiers) and the frame's Pull-ID. When modified frame 820 is received 555 at frame device 560 in back-end switch card 220, its receive queuing logic 135 passes the egress device's identity (encoded in shim word 815) to its receive routing 130 and receive queuing 135 logic. This information is then used to route/transmit frame 820 to egress device 515.

When frame 820 is received by egress device 515, it is recognized as a pulled frame (because it includes shim word 815). Accordingly, receive queuing logic 135 in egress device 515 can immediately route the frame (removing shim word 815) to the targeted external port 570 for transmission to the targeted external device. It is significant to note that egress device 515 is not required to perform a routing table lookup to determine data frame 500's (frame 820 after shim word 815 is removed) outward bound port is port 570. In general, data frames routed in accordance with the pull data transmission model have their Pull-ID's verified by the egress device's local transmit queuing logic 140 to ensure they are transmitted in the proper order. If a frame is received out of order at egress device 515, local transmit queuing logic 140 within egress device 515 includes special storage (not shown in FIG. 1) to accommodate one or more frames so that frame reordering (based on Pull-IDs) may be performed.

As discussed above, the flow of pulled data frames through device 100 in accordance with FIG. 5 is controlled by receive and transmit queuing logic. That is, receive queuing logic 135, local transmit queuing logic 140 and global transmit queuing logic 115. In one embodiment, receive queuing logic 135 implements local put and remote put queues as linked-list structures (FIG. 6) that are tracked by arrays of pointer structures (FIG. 7).

Figure 6:
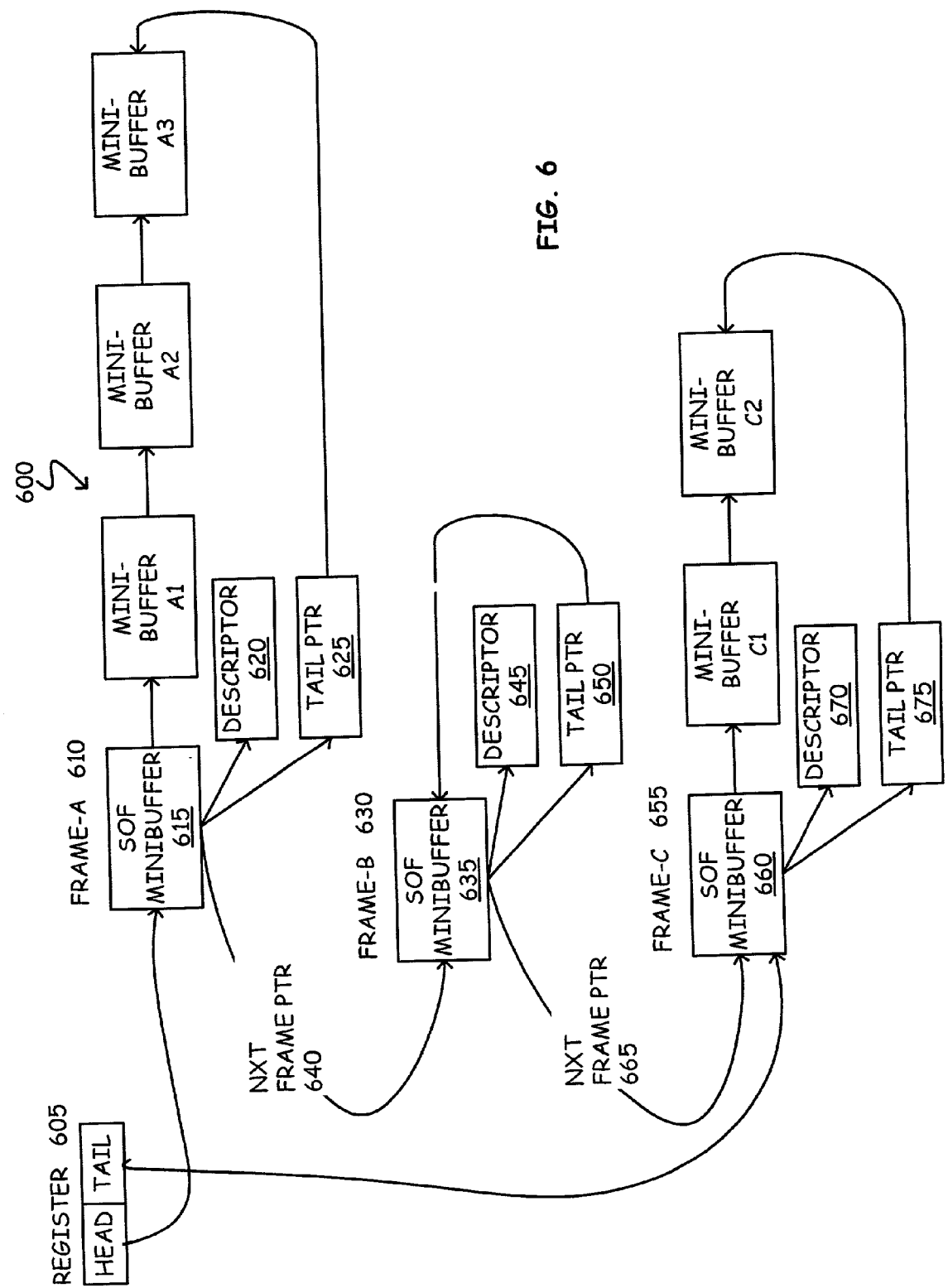
FIG. 6 shows a receive frame queuing structure in accordance with one embodiment of the invention.
Figure 7:
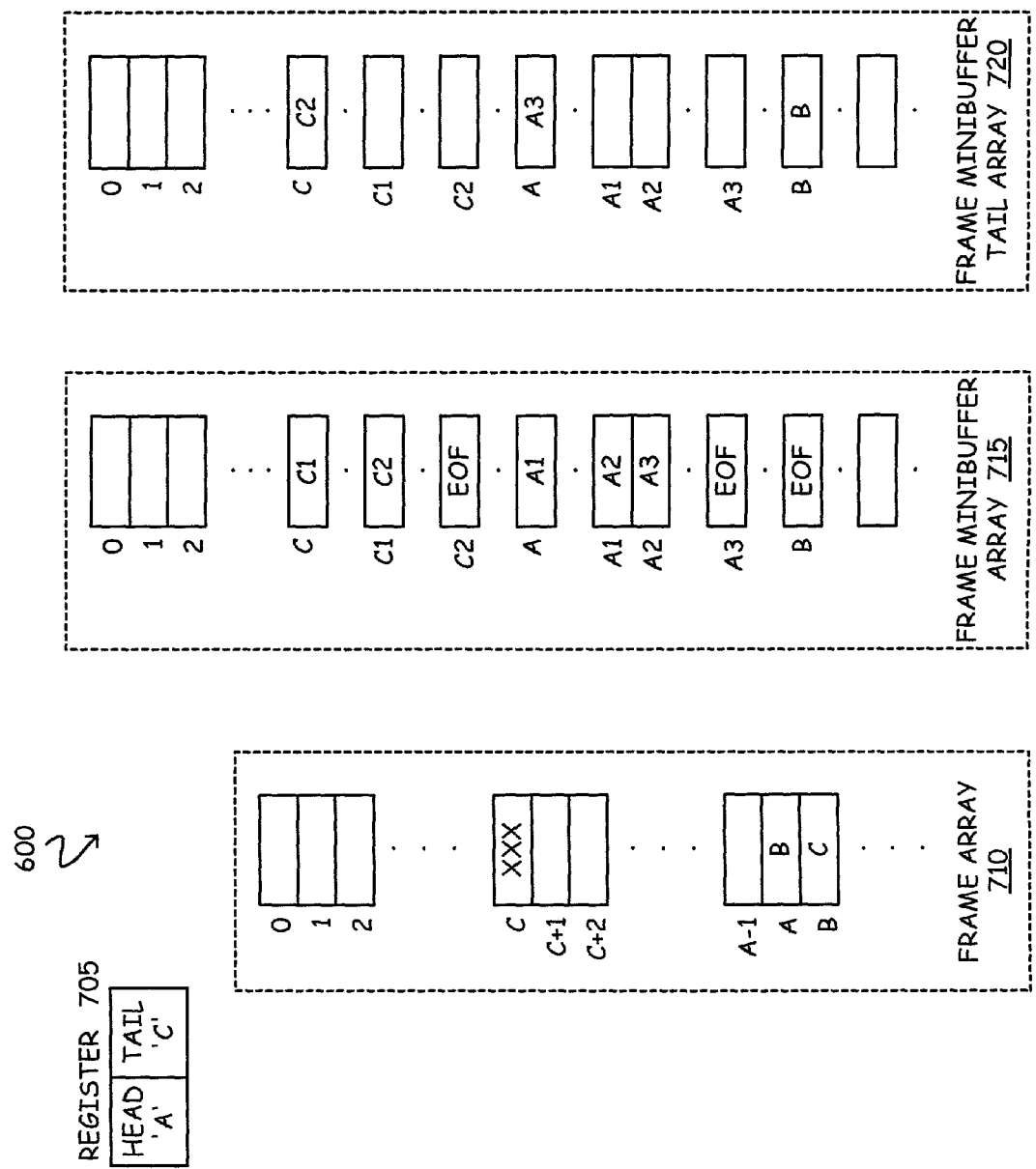
FIG. 7 shows a receive frame tracking structure in accordance with one embodiment of the invention.

Referring to FIG. 6, each queue's linked list structure 600 may use a hardware register 605 to identify the head and tail frames in memory 100 associated with that queue. (Recall, each frame received by device 100 is stored in memory 110.) In the embodiment illustrated in FIG. 6, each frame may be composed of up to 4 minibuffers, where a minibuffer is one-fourth the size of a maximum Fibre Channel frame. As shown, register 605 head portion points to frame-A 610 whose first minibuffer 615 includes receive buffer descriptor 620 (see discussion below) and the tail pointer 625. In this example, frame-A 610 consists of 4 minibuffers (615, Minibuffer A1, Minibuffer A2 and Minibuffer A3). Frame-A 610 indicates frame-B 630 (specifically start of frame minibuffer 635) through next frame pointer 640. In this example, frame-B 630 consists of only 1 minibuffer (635) which includes frame-B buffer descriptor 645 and tail pointer 650 elements. Similarly, Frame-B 630 indicates frame-C 655 (specifically start of frame minibuffer 660) through next frame pointer 665. In this example, frame-C 655 consists of 3 minibuffers (660, Minibuffer C1 and Minibuffer C2), the first of which (660) includes frame-C buffer descriptor 670 and tail pointer 675 elements. In one embodiment a device's internal memory may be partitioned such that all frames received from a first switch (i.e., through a specified port) are stored in a first partition while all frames received from a second switch are stored in a second partition. Each switch/port coupled to a device may have its own partition in which frames received from that switch/port are stored.

Receive frame descriptors 620, 645 and 670 include that information necessary to uniquely locate and identify the associated frame. In one embodiment receive frame descriptors include the information identified in Table 5. Field 1 indicates whether the associated frame is being transmitted in accordance with the pull model. Field 2 indicates if the associated frame is waiting for a get message before being transmitted to the targeted egress device. Field 3 indicates when the descriptor's associated frame was received at the ingress device. Field 4 indicates which ingress device port the associated frame was received from. Field 5 indicates the associated frame's pull-ID and is only filled in once the ingress device receives a Get Message (see discussion above). Fields 6 and 7 identify the targeted egress device. Field 8 indicates the ingress frame's virtual channel, if the frame is part of a virtual channel transmission. And field 9 indicates the ingress frame's arbitrated loop physical address, if the frame is part of an arbitrated loop transmission. Fields 8 and 9 are not used in the preferred embodiment of the pull model, being used only in push model cases. It should be noted that in one embodiment, the location (in the ingress device's memory 110) where the start of frame buffer/minibuffer descriptor is stored is identified by the frame descriptor's name. That is, the identify and existence of a frame descriptor inherently may indicate the start of the descriptor's associated frame or minibuffer in the device's internal memory.

TABLE 5

Receive Frame Descriptor Content

| Field | Content |
|---|---|
| 1 | Pull flag |
| 2 | Get pending flag |
| 3 | Timestamp |
| 4 | Ingress device port identifier |
| 5 | Pull-ID |
| 6 | Egress device identifier |
| 7 | Egress device output port identifier |
| 8 | Virtual channel identifier |
| 9 | Arbitrated loop physical address identifier |

Referring now to FIG. 7, link-list entries for each queue may be tracked through the use of arrays 700. In the embodiment of FIG. 7, each receive queue's link-list structure (e.g., structure 600) is tracked by 3 arrays and one register: register 705; frame array 710; frame minibuffer array 715; and minibuffer tail array 720. Register 705 indicates which entries in frame array 710 represent the queue's head (first) and tail (last) entries. For the illustrative link-list structure of FIG. 6, register 705 indicates that the receive queue's first entry is frame-A 610 and the queue's last entry is frame-C 660. The 'B' value in entry 'A' of frame array 710 indicates that the "next" frame in the receive queue is frame-B 630. The 'C' value in entry 'B' of frame array 710 indicates that the "next" frame (after frame-B) in the receive queue is frame-C 655. The 'XXX' value in entry 'C' of frame array 710 indicates that frame-C is the last frame currently in the queue. Frame minibuffer array 715 and frame minibuffer tail array 720 or organized in a similar fashion. In the embodiment of FIG. 7, each array has one entry for each minibuffer the queue can accommodate.

In one embodiment, the actions of putting an entry in a get queue or a local or remote put queue (see discussion above regarding FIG. 5, for example) is accomplished through entries in list structures in accordance with FIGS. 6 and 7. That is, data frames are kept only in device memory (e.g., central memory 110) while frame identification information in the form of descriptors (e.g., 620, 645 and 670) are moved from one queue (list structure) to another (list structure).

In a manner similar to that just discussed, global transmit queuing logic 115 and local transmit queuing logic 140 may implement, and process, put and get messages using queue (linked-list) structures. In one embodiment, this means each external transmit port maintains an independent list for each arbitrated loop destination or each virtual channel—depending upon the mode of operation of the transmitting port. More specifically, global queuing logic 115 can maintain a set of queues (list structures) for each external transmit port on a device. Each entry represents a frame that is targeted for the queue's associated external port. In one embodiment, global queuing structures have the capacity to hold information about a frame located in any minibuffer on any of 32 devices receiving frames from an external device (i.e., any device on one of front-end port cards 202–216 adapted to receive data from an external device 222). Global queues, however, track a frame for only a limited period of time— from the time a Remote Put Message is received until a Get Message for that frame is issued. Once a device (the egress device) issues a Get Message, the incoming frame's information is forwarded to local transmit queuing logic 140 which maintains it until the frame is actually transmitted out of the (egress) device. It is significant to note that, as a consequence, global queuing logic 115 need only be active on front-end port card devices.

In addition to maintaining message queue structures, global queuing logic 115 is responsible for choosing frames to "pull" from an ingress device. That is, global queuing logic 115 selects which Remote Put Messages it has received to issue a corresponding Get Message. Before a Get Message can be issued, certain resources within the egress device must be available. For example: if local transmit queuing logic 140's reordering function (logic) cannot accept another frame, a Get Message will not be generated; an egress device's port may not issue a Get Message if to do so would exceed that port's maximum number of outstanding pulled frames it is allowed at any time (which value is user selectable); a Get Message may also only be issued if there is a buffer in egress device's memory ready to hold the frame and the external device targeted to receive the frame can accept the frame.

Figure 9:
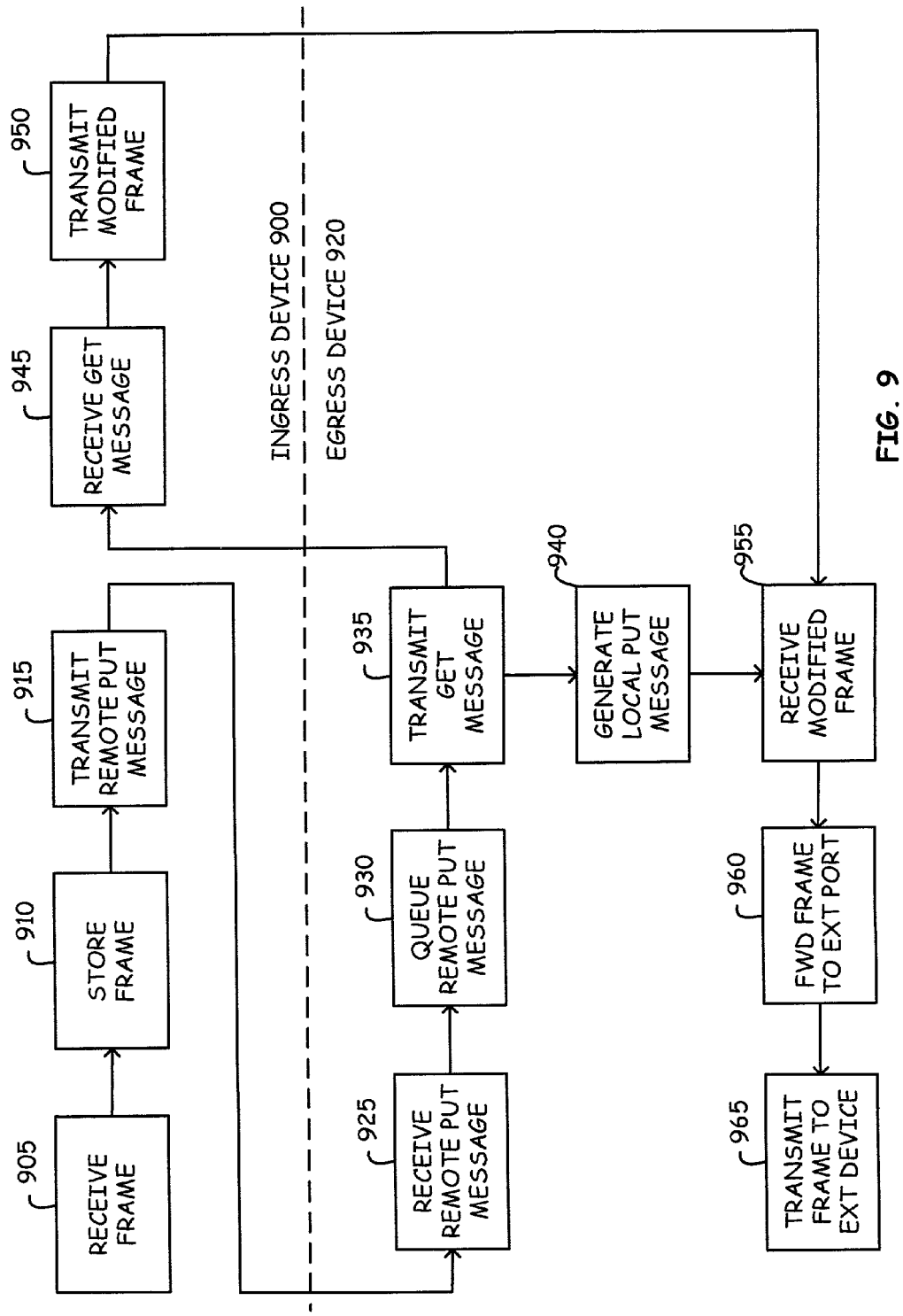
FIG. 9 illustrates, in flowchart form, the end-to-end data flow associated with transmitting a frame through a Fibre Channel switch in accordance with the invention.

The overall or end-to-end data flow of a data frame transmitted through a Fibre Channel switch using the pull model is illustrated in FIG. 9. Initially, ingress device 900 receives a data frame (block 905). The frame's header information is used to perform a routing table lookup as the frame is stored in the ingress device's memory (block 910). An entry for the frame is placed in the ingress device's remote put queue and, when a message port is able, the remote put queue entry is removed and a Remote Put Message is transmitted (block 915) to egress device 920. When egress device 920 receives the Remote Put Message through one of its message ports (block 925), the egress device's global transmit queuing logic makes an entry for the frame in a transmit list (block 930) and then waits until the resources needed for the frame are available. When the egress device's global transmit queuing logic determines that the frame may be accepted, it dequeues the frame's entry from the transmit list and causes an egress device's message port to generate a Get Message (block 935). At substantially the same time, the global transmit queuing logic in egress device 920 indicates to its local transmit queuing logic (block 940) to make an entry in its local transmit queue. When ingress device 920 receives the Get Message through one of its message ports (block 945), its receive queuing logic is notified which then triggers transmission (block 950) of a modified version of the received frame from ingress device 900's memory. (The modified frame comprises the originally received frame plus a shim word to identify the frame as a "pulled" frame.) After the modified frame is received at a port on egress device 920 (block 955), the egress device's receive queuing logic may route it immediately—without having to perform a routing table lookup—to a specified external port (block 960) for transmission to the targeted external device (block 965).

One benefit of a pull model in accordance with the invention is that information about received frames can be provided to an egress port without consuming buffer space in the egress device. This, in turn, allows an egress device to make queuing/frame transmission decisions based on switch-wide frame status information. (In the standard "push" frame transmission model, a port only has knowledge of those frames in its local buffers. Accordingly, the push model does not provide the ability to optimize frame transmission in a manner equivalent to a pull model.) The ability to consider switch-wide frame status information may be particularly beneficial when a port is operating in FL_Port mode as the pull model allows an egress device port to transmit more frames to a given external device per unit time. Another benefit of a pull model in accordance with the invention is that once a pulled frame is received at the egress device (that is, that device in a Fibre Channel switch through which the frame is transmitted to an external, non-switch, device), no routing table lookup operation is necessary (this operation is required by frames transmitted in accordance with the standard "push" data transmission model). This, in turn may improve frame transmission throughput rates and reduce the amount of memory needed in the egress device.

Various changes in the materials, components, circuit elements, as well as in the details of the illustrated operational method are possible without departing from the scope of the claims. For example, although each embodiment described herein implements the pull transmission model through messages transmitted and received through dedicated message ports, this need not be the case. In one alternative embodiment, pull messages are transmitted between switch devices through standard Fibre Channel ports (e.g., external ports). In this embodiment, each device may need to recognize and process pull frame data such as shim word 815. In addition, each frame may be divided into fewer than, or more than, 4 minibuffers (see discussion regarding FIGS. 6 and 7). Further, a frame descriptor may contain additional information than that described herein (see discussion regarding FIG. 6). For example, information associated with and used by standard "push" data transmission models may be incorporated in to a frame's descriptor. In addition, shim words may include additional information from that described herein and be placed in a different position within a frame (see discussion regarding FIG. 8).

Figure 10:
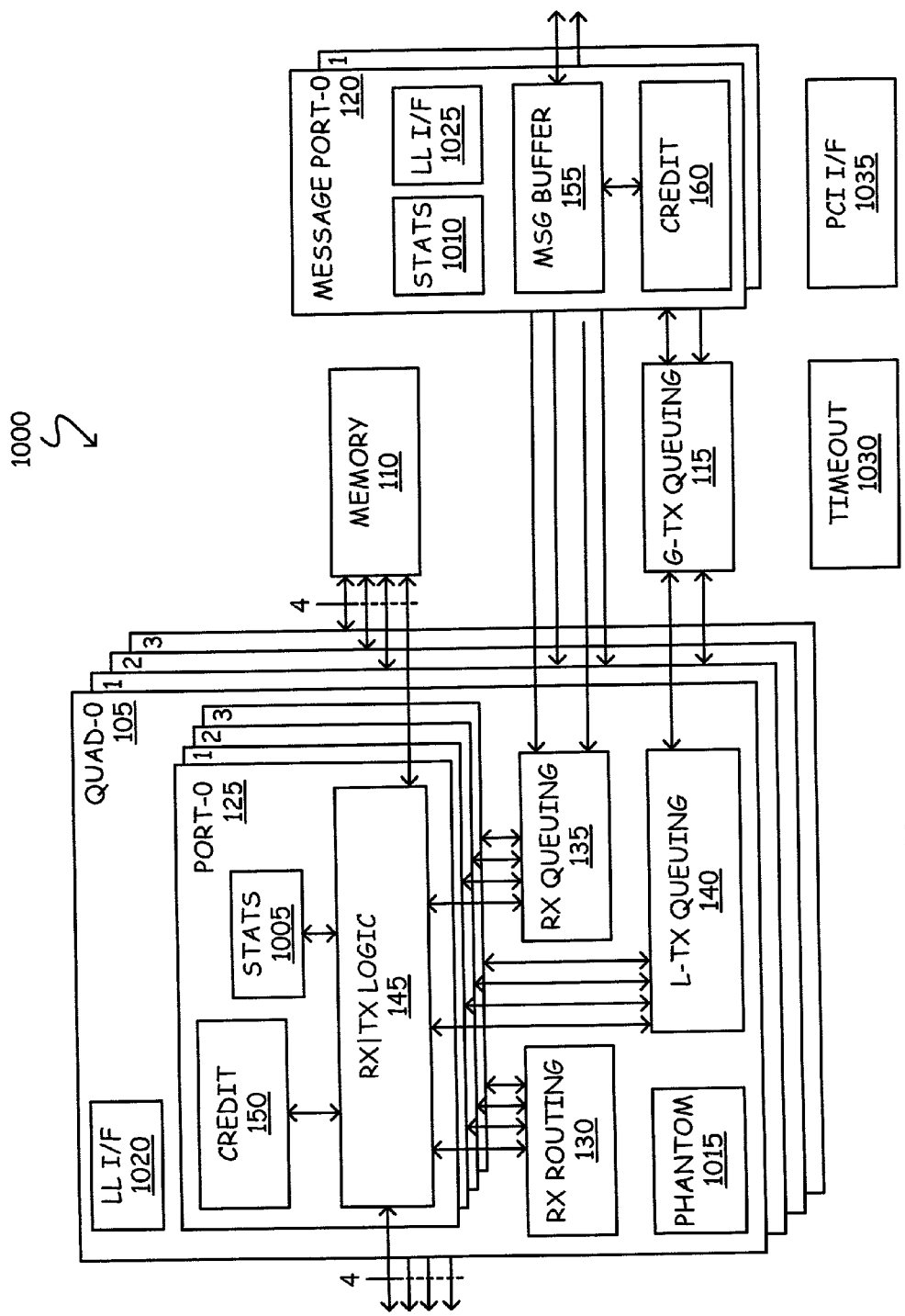
FIG. 10 shows, in block diagram form, a Fibre Channel switch device in accordance with another embodiment of the invention.

In one embodiment, the illustrative device of FIG. 1 may include additional functional elements such as those shown in FIG. 10. For example, each port (e.g., port-0 125 and message port-0 120) may include statistics logic (e.g., 1005 and 1010) for monitoring performance and error conditions in their related functional unit. Illustrative statistics tracked by statistics logic 1005 and 1010 include the number of frames processed by their respective operational units and the number of frames having CRC (cyclic redundancy code) errors. In addition, each operational unit (e.g., quad-0 105 may include phantom address translation logic 1015 to provide address translation tables for allowing communication between Fibre Channel public and private devices or communication between a fabric and a legacy system such as a legacy storage subsystem. Device 1000 may also include low level interface logic in each operational unit (e.g., logic 1020 in quad-0 105 and logic 1025 in message port-0 120) to allow direct communication between the operational unit and a secondary device such as an external processor (see discussion below). Each device 1000 may further include timeout logic 1030 for tracking and managing the timeout of received Fibre Channel frames and Peripheral Component Interface (PCI) interface logic 1035 to provide a communication path with an external device such as a programmable controller or processor.

By way of example, FIG. 11 illustrates part of a switch 1100 (e.g., switch 200) that includes device 1105, where device 1105 is a device in accordance with FIG. 1 and at least some of the additional functional elements shown in FIG. 10. As shown, device 1105 is coupled to system processor 1110 through PCI bus 1115, where PCI bus couples to device 1105 through PCI interface logic such as logic 1035 (see FIG. 10). System processor 1110 is coupled to storage 1120 and to non-switch devices through output ports 1125. Storage 1120 can include random access memory for storage of run-time data and instructions and read only memory (e.g., FLASH memory) for storing switch initialization and configuration information. Output ports 1125 may include Ethernet ports and/or RS-232 ports (or variations thereof) or any other type of port desired. System processor 1110 may be, for example, an Intel i960JF processor or a IBM 405GP PowerPC processor.

In addition, each of the functional units described herein as well as the acts illustrated in FIGS. 5 and 9 may be performed by one or more programmable control devices. A programmable control device may be a single computer processor, a plurality of computer processors coupled by a communications link, or a custom designed state machine driven, at least in part, by microcode or similar instructions. Custom designed state machines may be embodied in a hardware device such as a printed circuit board comprising discrete logic, integrated circuits, field programmable gate arrays (FPGAs) or specially designed application specific integrated circuits (ASICs). Storage devices suitable for tangibly embodying program instructions (e.g., microcode) to perform the acts described herein include all forms of non-volatile memory including, but not limited to: semiconductor memory devices such as erasable programmable read only memory (EPROM), electrically erasable programmable read only memory (EEPROM), and flash devices; magnetic disks (fixed, floppy, and removable); other magnetic media such as tape; and optical media such as CD-ROM disks.

While the invention has been disclosed with respect to a limited number of embodiments, numerous modifications and variations will be appreciated by those skilled in the art. It is intended, therefore, that the following claims cover all such modifications and variations that may fall within the true sprit and scope of the invention.

What is claimed is:

1. A Fibre Channel frame transmission method, comprising:

receiving, at a Fibre Channel port on a first Fibre Channel switch device, a first frame;

sending a first message to a second Fibre Channel switch device through a Fibre Channel port on the first Fibre Channel switch device, the first message indicating the first frame is to be transmitted as a pull-frame;

receiving a second message through a Fibre Channel port on the first Fibre Channel switch device, the second message indicating the second Fibre Channel switch device is adapted to receive and, substantially immediately, forward the first frame to a target destination; and sending the first frame to the second Fibre Channel switch device through a Fibre Channel port on the first Fibre Channel switch device, said first frame modified to indicate the identity of the second Fibre Channel switch device and a Fibre Channel port on the second Fibre Channel switch device through which the first frame is to be forwarded to the target destination.

2. The method of claim 1, wherein the act of sending a first message and the act of receiving a second message use the same Fibre Channel port on the first Fibre Channel switch device.

3. The method of claim 1, wherein the act of sending the first message and the act of sending the first frame use the same port on the first Fibre Channel switch device.

4. The method of claim 1, wherein the act of receiving the second message and the act of sending the first frame use the same port on the first Fibre Channel switch device.

5. The method of claim 1, wherein the act of receiving a first frame comprises receiving a Fibre Channel compliant frame.

6. The method of claim 1, wherein the first and second Fibre Channel switch devices are different Fibre Channel switch devices.

7. The method of claim 1, wherein the act of receiving a first frame further comprises:

storing at least a portion of the first frame in a memory associated with the first Fibre Channel switch device; and performing a routing table lookup operation on at least a portion of the first frame to identify the second Fibre Channel switch device and the port on the second Fibre Channel switch device.

8. The method of claim 7, wherein the act of sending the first message comprises generating a put-message, the put-message comprising:

a first field indicating the first message is a put-type message;

a second field indicating the identity of the second Fibre Channel switch device;

a third field indicating the port on the second Fibre Channel switch device;

a fourth field indicating the identity of the first Fibre Channel switch device; and a fifth field indicating a location in the memory associated with the first frame.

9. The method of claim 8, wherein the act of generating the put-message includes generating a put-message further comprising:

a sixth field indicating a virtual channel identifier associated with the first frame; and a seventh field indicating an arbitrated loop-physical address associated with the first frame.

10. The method of claim 9, wherein only one of the sixth and seventh fields indicate a true value.

11. The method of claim 1, wherein the act of sending a first message comprises using a message port.

12. The method of claim 1, wherein the act of receiving a second message comprises using a message port.

13. The method of claim 1, wherein the act of sending the first message comprises sending the first message to a third Fibre Channel switch device, the third Fibre Channel switch device being different than the second Fibre Channel switch device and comprising a portion of a Fibre Channel switch.

14. The method of claim 13, wherein the act of sending the first message further comprises the third Fibre Channel switch device routing the first message to the second Fibre Channel switch device.

15. The method of claim 1, wherein the act of receiving a second message comprises receiving a pull-frame identifier for the first frame.

16. The method of claim 15, wherein the act of sending the first frame comprises inserting into the first frame:

the pull-frame identifier;

the identity of the second Fibre Channel switch device; and the identify of the port on the second Fibre Channel switch device.

17. The method of claim 16, wherein the act of sending the first frame comprises sending the first frame to a third Fibre Channel switch device, the third Fibre Channel switch device being different than the second Fibre Channel switch device and comprising a portion of a Fibre Channel switch.

18. The method of claim 17, wherein the act of sending the first frame further comprises the third Fibre Channel switch device routing the first frame to the second Fibre Channel switch device.

19. The method of claim 1, wherein the act of receiving a first frame at a Fibre Channel port on a first Fibre Channel switch device comprises storing at least a portion of the first frame in a memory uniquely associated with the Fibre Channel port.

20. A Fibre Channel switch device, comprising:

a Fibre Channel port for receiving a first frame;

a Fibre Channel port for sending a first message to a second Fibre Channel switch device, the first message indicating the first frame is to be transmitted as a pull-frame;

a Fibre Channel port for receiving a second message from the second Fibre Channel switch device, the second message indicating the second Fibre Channel switch device is adapted to receive and substantially immediately forward the first frame to a target destination; and a Fibre Channel port for sending the first frame to the second Fibre Channel switch device, said first frame modified to indicate the first frame is a pull-frame.

21. The device of claim 20, wherein said Fibre Channel port for receiving a first frame further comprises a memory to store at least a portion of a received frame, wherein said memory is partitioned such that only frames from a specified port are stored in a specified partition.

22. The device of claim 20, wherein the Fibre Channel port sending the first message and the Fibre Channel port receiving the second message comprise the same Fibre Channel port.

23. The device of claim 22, wherein the same Fibre Channel port comprises a message port.

24. The device of claim 20, wherein the Fibre Channel port sending the first message and the Fibre Channel port sending the first frame comprise the same Fibre Channel port.

25. The device of claim 20, wherein the Fibre Channel port receiving the second message and the Fibre Channel port sending the first frame comprise the same Fibre Channel port.

26. The device of claim 23, wherein the message port is further adapted to couple only to another Fibre Channel switch device.

27. The device of claim 20, wherein the Fibre Channel port receiving the first frame is adapted to:

store at least a portion of the first frame in a memory; and perform a routing table lookup operation on at least a second portion of the first frame to identity the second Fibre Channel switch device and the port on the second Fibre Channel switch device.

28. The device of claim 27, wherein the Fibre Channel port for sending the first message is adapted to generate a put-message, the put-message comprising:
   a first field indicating the first message is a put-type message;
   a second field indicating the identity of the second Fibre Channel switch device;
   a third field indicating the port on the second Fibre Channel switch device;
   a fourth field indicating the identity of the first Fibre Channel switch device; and
   a fifth field indicating a location in the memory associated with the first frame.

29. The device of claim 28, wherein the Fibre Channel port for generating put-message, is adapted to generate a put-message further comprising:
   a sixth field indicating a virtual channel identifier associated with the first frame; and
   a seventh field indicating an arbitrated loop-physical address associated with the first frame.

30. The device of claim 29, wherein only one of the sixth and seventh fields indicate a true value.

31. The device of claim 20, wherein the second message further indicates a pull-frame identifier associated with the first frame.

32. The device of claim 31, wherein the Fibre Channel port for sending the first frame is adapted to modify the first frame to include:
   the pull-frame identifier;
   the identity of the second Fibre Channel switch device; and
   the identify of the port on the second Fibre Channel switch device.

33. A Fibre Channel frame transmission method, comprising:
   receiving a first message from a first Fibre Channel switch device through a Fibre Channel port on a second Fibre Channel switch device;
   acquiring resources at the second Fibre Channel switch device for a frame identified by the first message;
   sending a second message to the first Fibre Channel switch device through a Fibre Channel port on the second Fibre Channel switch device, the second message indicating that the second Fibre Channel switch device can accept the frame from the first Fibre Channel switch device and, substantially immediately, forward the frame to a target device, the second message further indicating a pull-frame identifier associated with the frame; and
   receiving the frame at a Fibre Channel port on the second Fibre Channel switch device, the frame including the pull-frame identifier.

34. The method of claim 33, wherein the acts of receiving the first message and sending the second message use message ports.

35. The method of claim 34, wherein the acts of receiving the first message and sending the second message use the same message port.

36. The method of claim 33, wherein the act of receiving the first message and the act of receiving the frame use the same Fibre Channel port.

37. The method of claim 33, wherein the act of sending the second message and the act of receiving the frame use the same Fibre Channel port.

38. The method of claim 33, wherein the act of acquiring resources comprises obtaining authorization to send the frame to a targeted external device.

39. The method of claim 33, wherein the first and second Fibre Channel switch devices are different Fibre Channel switch devices.

40. The method of claim 33, wherein the act of receiving the first message comprises receiving a put-message comprising:
   a first field indicating the first message is a put-type message;
   a second field indicating the identity of the second Fibre Channel switch device;
   a third field indicating a port on the second Fibre Channel switch device;
   a fourth field indicating the identity of the first Fibre Channel switch device; and
   a fifth field indicating a location of the frame in storage associated with the first Fibre Channel switch device and further associated with the first message.

41. The method of claim 33, wherein the act of sending a second message comprises generating the pull-frame identifier.

42. The method of claim 41, wherein the act of sending the second message further comprises including an identifier in the second message indicting the message is a get-message.

43. The method of claim 33, wherein the act of receiving the frame at a Fibre Channel port on a second Fibre Channel switch device comprises storing at least a portion of the frame in a memory uniquely associated with the Fibre Channel port.

44. The method of claim 33, further comprising routing, substantially immediately, the frame to a second Fibre Channel port on the second Fibre Channel switch device, wherein the second Fibre Channel port on the second Fibre Channel port on the second Fibre Channel switch device is adapted to couple to an external device.

45. The method of claim 44, wherein the act of routing further comprises using the pull-frame identifier to sequence routing of the frame to the Fibre Channel port.

46. The method of claim 45, wherein the act of routing further comprises removing the pull-frame identifier from the frame before routing the frame to the Fibre Channel port.

47. The method of claim 33, wherein the act of sending the second message comprises sending the second message to a third Fibre Channel switch device, the third Fibre Channel switch device being different than the first Fibre Channel switch device and comprising a portion of a Fibre Channel switch.

48. A Fibre Channel switch device, comprising:
   a Fibre Channel port for receiving a first message, the first message associated with a Fibre Channel frame;
   setup means for acquiring resources to receive the frame;
   a Fibre Channel port for sending a second message, the second message transmitted in response to the first message and indicating a pull-frame identifier for the frame; and
   a Fibre Channel port for receiving the frame, the frame including the pull-frame identifier.

49. The device of claim 48, wherein the Fibre Channel port for receiving the first message and for transmitting the second message comprise message ports.

50. The device of claim 49, wherein the message ports for receiving the first message and for transmitting the second message comprise the same message port.

51. The device of claim 49, wherein the message ports are adapted to couple only to another Fibre Channel switch device.

52. The device of claim 48, wherein the Fibre Channel ports for receiving the first message and the frame comprise the same Fibre Channel port.

53. The device of claim 48, wherein the Fibre Channel ports for sending the second message and for receiving the frame comprise the same Fibre Channel port.

54. The device of claim 48, wherein the setup means for acquiring resources is adapted to obtain authorization from a targeted external device to send the frame to the targeted external device.

55. The device of claim 48, wherein said Fibre Channel port for receiving the frame comprises a memory to store at least a portion of the frame, wherein said memory is partitioned such that only frames from said Fibre Channel port are stored therein.

56. The device of claim 48, wherein the Fibre Channel port for receiving the first message is adapted to receive a first message comprising:
 a first field indicating the first message is a put-type message;
 a second field indicating the identity of the second Fibre Channel switch device;
 a third field indicating a port on the second Fibre Channel switch device;
 a fourth field indicating the identity of the first Fibre Channel switch device; and
 a fifth field indicating a location of the frame in storage associated with the first Fibre Channel switch device and further associated with the first message.

57. The device of claim 48, wherein the Fibre Channel port for sending the second message is further adapted to include an identifier in the second message indicting the message is a get-message.

58. The device of claim 48, wherein the Fibre Channel port for receiving the frame is further adapted to route, substantially immediately, the frame to a Fibre Channel port adapted to couple to an external device.

59. The device of claim 58, wherein the Fibre Channel port for receiving the frame is further adapted to use the pull-frame identifier to sequence routing of the frame to the Fibre Channel port adapted to couple to the external device.

60. The device of claim 59, wherein Fibre Channel port for receiving the frame is further adapted to remove the pull-frame identifier from the frame before routing the frame to the Fibre Channel port adapted to couple to the external device.

61. The device of claim 59, wherein Fibre Channel port adapted to couple to the external device is further adapted to remove the pull-frame identifier from the frame before routing the frame to the external device.

62. A Fibre Channel frame transmission method, comprising:
 receiving at a first Fibre Channel port on a first Fibre Channel switch device, a Fibre Channel frame;
 sending a first message to a second Fibre Channel switch device through a first message port on the first Fibre Channel switch device;
 receiving a second message through a second message port on the first Fibre Channel switch device;
 modifying the frame to indicate the identity of the second Fibre Channel switch device and a Fibre Channel port on the second Fibre Channel switch device; and
 sending the modified frame to the second Fibre Channel switch device through a second Fibre Channel port on the first Fibre Channel switch device.

63. The method of claim 62, wherein the act of sending the first message through a first message port and the act of sending the second message through a second message port comprise using the same message port.

64. The method of claim 62, wherein the act of receiving the frame through the first Fibre Channel port and the act of sending the modified frame through a second Fibre Channel port comprises using the same Fibre Channel port.

65. The method of claim 62, wherein the act of receiving a frame comprises receiving a Fibre Channel compliant frame.

66. The method of claim 65, wherein the first and second Fibre Channel switch devices are different Fibre Channel switch devices.

67. The method of claim 62, wherein the act of receiving the frame further comprises:
 storing at least a portion of the frame in a memory associated with the first Fibre Channel switch device; and
 performing a routing table lookup operation on at least a portion of the frame to the identity the second Fibre Channel switch device and the port on the second Fibre Channel switch device.

68. The method of claim 67, wherein the act of sending the first message comprises generating a put-message, the put-message comprising:
 a first field indicating the first message is a put-type message;
 a second field indicating the identity of the second Fibre Channel switch device;
 a third field indicating the port on the second Fibre Channel switch device;
 a fourth field indicating the identity of the first Fibre Channel switch device; and
 a fifth field indicating a location in the memory associated with the first frame.

69. The method of claim 68, wherein the put-message further comprises:
 a sixth field indicating a virtual channel identifier associated with the first frame; and
 a seventh field indicating an arbitrated loop-physical address associated with the first frame.

70. The method of claim 69, wherein only one of the sixth and seventh fields indicate a true value.

71. The method of claim 62, wherein the act of sending the first message comprises sending the first message to a third Fibre Channel switch device, the third Fibre Channel switch device being different than the second Fibre Channel switch device and comprising a portion of a Fibre Channel switch.

72. The method of claim 62, wherein the act of receiving a Fibre Channel frame at a first Fibre Channel port on a first Fibre Channel switch device comprises storing at least a portion of the frame in a memory uniquely associated with the first Fibre Channel port.

73. The method of claim 62, wherein the act of receiving a second message comprises receiving a pull-frame identifier for the frame.

74. The method of claim 73, wherein the act of sending the modified frame comprises inserting into the first frame:

the pull-frame identifier;
the identity of the second Fibre Channel switch device; and
the identify of the port on the second Fibre Channel switch device.

75. The method of claim 74, wherein the act of sending the modified frame comprises sending the modified frame to a third Fibre Channel switch device, the third Fibre Channel switch device being different than the second Fibre Channel switch device and comprising a portion of a Fibre Channel switch.

76. The method of claim 75, wherein the act of sending the modified frame further comprises the third Fibre Channel switch device routing the modified frame to the second Fibre Channel switch device.

77. A Fibre Channel switch control device, comprising:
a first Fibre Channel port for receiving a Fibre Channel frame;
a first message port for sending a put-message to a second Fibre Channel switch control device, the put-message associated with the frame;
a second message port for receiving a get-message from the second Fibre Channel switch control device, the get-message associated with the frame; and
a second Fibre Channel port for modifying the frame to indicate it is a pull-frame and for sending the modified frame to the second Fibre Channel switch control device.

78. The device of claim 77, wherein the first and second message ports comprise the same message port.

79. The device of claim 77, wherein the first and second Fibre Channel ports comprise the same Fibre Channel port.

80. The device of claim 77, wherein the first Fibre Channel port is adapted to store data associated with the frame in a storage.

81. The device of claim 80, wherein the first Fibre Channel port is further adapted to perform a routing table lookup operation on at least a portion of the frame to identity the second Fibre Channel switch control device.

82. The device of claim 80, wherein the first message port is adapted to generate a put-message comprising:
a first field indicating the first message is a put-type message;
a second field indicating the identity of the second Fibre Channel switch device;
a third field indicating a port on the second Fibre Channel switch device;
a fourth field indicating the identity of the first Fibre Channel switch device; and
a fifth field indicating a location in the storage associated with the first frame.

83. The device of claim 82, wherein the first message port is adapted to generate a put-message further comprising a sixth field indicating a virtual channel identifier if the first frame is part of a virtual channel, and a sixth field indicating an arbitrated loop-physical address if the first frame is part of an arbitrated loop transmission.

84. The device of claim 77, wherein the first message port is further adapted to couple only to another Fibre Channel switch control device.

85. The device of claim 77, wherein the second message port is adapted to receive a get-message comprising a pull-frame identifier for the frame.

86. The device of claim 85, wherein the second Fibre Channel port is adapted to modify the first frame to include:
the pull-frame identifier;
the identity of the second Fibre Channel switch control device; and
the identify of a port on the second Fibre Channel switch control device.

87. The Fibre Channel switch control device of claim 77, wherein said first Fibre Channel port for receiving a Fibre Channel frame comprises a memory to store at least a portion of the frame, wherein said memory is partitioned such that only frames from said first Fibre Channel port are stored therein.

88. A Fibre Channel frame transmission method, comprising:
receiving a first message from a first Fibre Channel switch device through a message port on a second Fibre Channel switch device;
acquiring resources at the second Fibre Channel switch device for a Fibre Channel frame identified by the first message;
sending a second message to the first Fibre Channel switch device through a message port on the second Fibre Channel switch device, the second message indicating that the second Fibre Channel switch device can accept the frame from the first Fibre Channel switch device, the second message further indicating a pull-frame identifier associated with the frame; and
receiving the frame at a Fibre Channel port on the second Fibre Channel switch device, the frame including the pull-frame identifier.

89. The method of claim 88, wherein the act of receiving the first message through a message port and the act of sending the second message through a message port use the same message port.

90. The method of claim 88, wherein the act of receiving the first message through a message port and the act of receiving the frame through a Fibre Channel port use the same port.

91. The method of claim 88, wherein the act of receiving the first message comprises receiving a put-message comprising:
a first field indicating the first message is a put-type message;
a second field indicating the identity of the second Fibre Channel switch device;
a third field indicating a port on the second Fibre Channel switch device;
a fourth field indicating the identity of the first Fibre Channel switch device; and
a fifth field indicating a location of the frame in storage associated with the first Fibre Channel switch device and further associated with the first message.

92. The method of claim 88, wherein act of receiving a first message through a message port and the act of sending a second message through a message port comprise using message ports adapted to only couple to another Fibre Channel switch device.

93. The method of claim 88, wherein the act of sending a second message comprises generating the pull-frame identifier.

94. The method of claim 93, wherein the act of sending the second message further comprises including an identifier in the second message indicting the message is a get-message.

95. The method of claim 88, further comprising routing, substantially immediately, the frame to a Fibre Channel port adapted to couple to an external device.

96. The method of claim 95, wherein the act of routing further comprises using the pull-frame identifier to sequence routing of the frame to the Fibre Channel port adapted to couple to an external device.

97. The method of claim 95, wherein the act of routing further comprises removing the pull-frame identifier from the frame before routing.

98. The method of claim 88, wherein the act of sending the second message comprises sending the second message to a third Fibre Channel switch device, the third Fibre Channel switch device being different than the first Fibre Channel switch device and comprising a portion of a Fibre Channel switch.

99. The method of claim 88, wherein the act of receiving the frame at a Fibre Channel port on the second Fibre Channel switch device comprises storing at least a portion of the frame in a memory uniquely associated with the Fibre Channel port.

100. A Fibre Channel switch control device comprising:
a message port for receiving a put-message, the put-message associated with a Fibre Channel frame;
a message port for sending a get-message in response to the put-message, the get-message indicating a pull-frame identifier for the frame; and
a Fibre Channel port for receiving the frame, the frame including the pull-frame identifier.

101. The device of claim 100, wherein the Fibre Channel port is further adapted to route, substantially immediately, the frame to another Fibre Channel port.

102. The device of claim 101, wherein the Fibre Channel port is further adapted to sequence routing of the frame to the another Fibre Channel port based on the pull-frame identifier.

103. The device of claim 101, wherein the Fibre Channel port is further adapted to remove the pull-frame identifier from the frame before routing the frame to the another Fibre Channel port.

104. The device of claim 100, wherein the message port for receiving the put-message and the message port for sending the get-message are dedicated message ports that are not adapted to receive Fibre Channel compliant frames.

105. The device of claim 104, wherein the message ports are the same message ports.

106. The device of claim 100, wherein the message port for receiving the put-message is adapted to receive a put-message comprising:
a first field indicating the message is a put-type message;
a second field indicating the identity of the Fibre Channel switch device;
a third field indicating a Fibre Channel port on the Fibre Channel switch device;
a fourth field indicating an identity of a Fibre Channel switch device that originated the put-message; and
a fifth field indicating a location of the first frame in a storage associated with the first frame in the Fibre Channel switch device that originated the put-message.

107. The device of claim 100, wherein the message port for sending the get-message is adapted to send a get-message comprising:
a first field indicating the message is a get-type message;
a second field indicating the pull-frame identifier;
a third field identifying another Fibre Channel switch control device; and
a fourth field identifying a Fibre Channel port on said another Fibre Channel switch control device.

108. The Fibre Channel switch control device of claim 100, wherein said Fibre Channel port for receiving the frame further comprises a memory to store at least a portion of the frame, wherein the memory is partitioned such that only frames from said Fibre Channel port are stored in said partition.

109. A Fibre Channel switch, comprising:
a first Fibre Channel switch control device adapted to receive a Fibre Channel frame from a first external device; and
a second Fibre Channel switch control device adapted to send the Fibre Channel frame to a second external device, wherein
the first Fibre Channel switch control device is farther adapted to send a put-message to the second Fibre Channel switch control device in response to the received frame, the put-message indicating that the frame is a pull-frame,
the second Fibre Channel switch control device is further adapted to send a get-message to the first Fibre Channel switch control device in response to the put-message, the get-message including a pull-frame identifier for the frame,
the first Fibre Channel switch control device is farther adapted to modify the frame to include the pull-frame identifier and then to send the frame to the second Fibre Channel switch control device, and
the second Fibre Channel switch control device is further adapted to receive the modified frame.

110. The Fibre Channel switch of claim 109, wherein the first and second external devices comprise Fibre Channel compliant peripheral devices.

111. The Fibre Channel switch of claim 109, wherein the first Fibre Channel switch device is further adapted to store at least a portion of the Fibre Channel frame in a storage.

112. The Fibre Channel switch of claim 111, wherein the first Fibre Channel switch device is adapted to send a put-message comprising:
a first field indicating the identity of the second Fibre Channel switch device;
a second field indicating a port on the second Fibre Channel switch device;
a third field indicating the identity of the first Fibre Channel switch device; and
a fourth field indicating a location in the storage associated with the Fibre Channel frame.

113. The Fibre Channel switch of claim 112, wherein the second Fibre Channel switch device is further adapted to route the modified frame to that port indicated in the second field.

114. The Fibre Channel switch of claim 113, wherein the second Fibre Channel switch device is further adapted to remove the pull-frame identifier from the modified frame prior to sending the modified frame to the second external device.

115. A Fibre Channel switch device, comprising:
storage adapted to store Fibre Channel frame data;
Fibre Channel ports for sending and receiving Fibre Channel frames, said Fibre Channel ports operatively coupled to said storage;
first logic means for determining that a Fibre Channel frame received through one of said Fibre Channel ports is to be transmitted as a pull-frame;
message means for
generating and sending a put-message to another Fibre Channel switch device, said put-message associated with a received frame determined to be a pull-frame, and receiving a get-message in response to the put-message; and second logic means for modifying said pull-frame to include pull-frame data fields, and indicating to one of said Fibre Channel ports to send said pull-frame.

116. The device of claim 115, wherein the Fibre Channel ports comprise a plurality of Fibre Channel port circuits, each port circuit adapted to provide serial links for sending and receiving Fibre Channel frames.

117. The device of claim 116, wherein a first portion of the Fibre Channel port circuits are adapted to couple to external devices and a second portion of the Fibre Channel port circuits are adapted to couple only to another one or more Fibre Channel switch devices.

118. The device of claim 115, wherein the first logic means comprises receive routing logic.

119. The device of claim 115, wherein the first logic means determines that a Fibre Channel frame received through the one of said Fibre Channel ports is to be transmitted as a pull-frame if the Fibre Channel frame is a unicast frame received from an external device.

120. The device of claim 115, wherein the message means comprises one or more message port circuits, each message port circuit adapted to provide a serial differential electrical link for sending and receiving Fibre Channel frame messages, said Fibre Channel frame messages being different from Fibre Channel frames.

121. The device of claim 115, wherein the message means for generating and sending a put-message is adapted to generate and send a put-message comprising:
 a first field indicating the message is a put-type message;
 a second field indicating the identity of a second Fibre Channel switch device;
 a third field indicating a port on the second Fibre Channel switch device;
 a fourth field indicating the identity of the Fibre Channel switch device; and
 a fifth field indicating a location in the storage associated with the pull-frame.

122. The device of claim 115, wherein the message means for receiving a get-message is adapted to receive a get-message comprising:
 a first field indicating a pull-frame identifier;
 a second field indicating the identity of the Fibre Channel switch device; and
 a third field indicating the identity of a port on the Fibre Channel switch device.

123. The Fibre Channel switch device of claim 115, wherein said storage is partitioned such that each of said Fibre Channel ports are associated with one partition.

124. A Fibre Channel switch, comprising:
 an ingress device adapted to receive a Fibre Channel frame from a first external device;
 an egress device adapted to send the Fibre Channel frame to a second external device; and
 a plurality of devices adapted to relay the Fibre Channel frame from the ingress device to the egress device and further adapted to relay pull-routing messages between the ingress and egress devices, wherein
  the ingress device is further adapted to send a put-message to the egress device through at least one of the plurality of devices in response to receipt of the first Fibre Channel frame, the put-message indicating that the first Fibre Channel frame is a pull-frame,
  the egress device is further adapted to send a get-message to the ingress device through at least one of the plurality of devices in response to the put-message, the get-message including a pull-frame identifier for the first Fibre Channel frame,
  the ingress device further adapted to send the Fibre Channel frame to the egress device, through at least one of the plurality of devices, the ingress device adapted to modify the Fibre Channel frame to include the pull-frame identifier, and
  the egress device further adapted to send the Fibre Channel frame to the second external device.

125. The Fibre Channel switch of claim 124, wherein the first and second external devices comprise Fibre Channel compliant peripheral devices.

126. The Fibre Channel switch of claim 124, wherein the ingress device is further adapted to store at least a portion of the Fibre Channel frame in a storage.

127. The Fibre Channel switch of claim 126, wherein the ingress device is adapted to send a put-message comprising:
 a first field indicating the identity of the egress device;
 a second field indicating a port on the egress device;
 a third field indicating the identity of the ingress device; and
 a fourth field indicating a location in the storage associated with the Fibre Channel frame.

128. The Fibre Channel switch of claim 127, wherein the egress device is further adapted to route the Fibre Channel frame to the indicated port in accordance with the second field.

129. The Fibre Channel switch of claim 128, wherein the egress device is further adapted to remove the pull-frame identifier from the Fibre Channel frame prior to sending the Fibre Channel frame to the second external device.

130. A Fibre Channel fabric, comprising two or more Fibre Channel switches in accordance with claim 124 communicatively coupled.

* * * * *